United States Patent [19]
Burgess et al.

[11] Patent Number: 5,727,197
[45] Date of Patent: Mar. 10, 1998

[54] METHOD AND APPARATUS FOR SEGMENTING A DATABASE

[75] Inventors: John G. Burgess, Vienna, Va.; Randall E. Breeden, Gaithersburg, Md.

[73] Assignee: FileTek, Inc., Rockville, Md.

[21] Appl. No.: 551,493

[22] Filed: Nov. 1, 1995

[51] Int. Cl.$^6$ .................................................. G06F 17/30
[52] U.S. Cl. .......................... 395/602; 395/601; 395/611; 395/616; 395/620
[58] Field of Search ........................... 395/603, 605, 395/606, 440, 497.01, 601, 602, 611, 616, 620; 371/404; 364/400

[56] References Cited

U.S. PATENT DOCUMENTS

| | | | |
|---|---|---|---|
| 4,731,724 | 3/1988 | Michel et al. | 364/200 |
| 4,864,572 | 9/1989 | Rechen et al. | 371/2.1 |
| 4,879,648 | 11/1989 | Cochran et al. | 364/300 |
| 5,247,660 | 9/1993 | Ashcraft et al. | 395/600 |
| 5,471,677 | 11/1995 | Imanaka | 395/600 |
| 5,485,475 | 1/1996 | Takagi | 371/404 |
| 5,511,186 | 4/1996 | Carhart et al. | 395/600 |
| 5,530,829 | 6/1996 | Beardsley et al. | 395/440 |
| 5,551,024 | 8/1996 | Waters | 395/600 |
| 5,553,281 | 9/1996 | Brown et al. | 395/600 |
| 5,623,701 | 4/1997 | Bakke et al. | 395/888 |

OTHER PUBLICATIONS

"Information View Open Archive: An Optical Disk Extension For Sybase," Aug. 21, 1995; pp. 1–10.

Feuerstein, Kimball, "Introduction to the Red Brick Warehouse," 1994.

DEC DB Integrator, pp. 4–19 through 4–20; date unknown.

DeWitt, et al., "GAMMA: A High Performance Dataflow Database Machine," Computer Sciences Technical Report #635, Mar. 1986, pp. 7–9.

"Specialized Requirements for Relational Data Warehouse Servers," A Red Brick Systems White Paper, no date.

Database 2 For MVS/ESA Version 4 DB2 for MVS/ESA: Administrative Guide III Draft, "Is Access Through a Partition Scan?" IBM Corp., 1994, 1995.

Teradata Concepts and Facilities, C02–0001–04, Release 3.0, DBC/1012 Data Base Computer, pp. i–I5, 1987.

*Primary Examiner*—Thomas G. Black
*Assistant Examiner*—Frantz Coby
*Attorney, Agent, or Firm*—Finnegan, Henderson, Farabow, Garrett & Dunner, L.L.P.

[57] ABSTRACT

A relational database method and apparatus includes a database that is divided into multiple data segments, each of which may be independently stored on one of a variety of storage devices. As data from the relational database is being loaded, the number of data segments will increase. A range index is used as a high level filter to determine which indices and data segments will be used to process a query of the database.

20 Claims, 12 Drawing Sheets

METHOD AND APPARATUS FOR SEGMENTING A DATABASE

BACKGROUND OF THE INVENTION

1. Field of the Invention

The present invention relates to the field of database storage and access generally, and in particular, to the field of storage and access of very large relational or object-oriented databases.

Description of the Related Art

Generally, a database is a collection of data, such as a telephone book or the card catalog at a library. Databases are very powerful when used with computers. A computer database organizes data so that various computer programs can access and update the information which typically resides on a computer-readable medium in one central store or file. The data in a computer database is stored as records having a number of fields.

One specialized type of computer database is called a relational database. The relational database's organizational scheme treats the database as multiple tables of data in which rows represent variable length records and the columns represent fields. Relational databases give the user the flexibility to link information stored in many tables. They allow users to interchange and cross-reference information between two different types of records, such as comparing the information in a group of invoices to the information in an inventory. One popular relational database accessing standard is the relational database language SQL (structured query language). SQL allows users to present near-English queries to the database manager to view or retrieve specific information from the database in a variety of different ways.

In many applications, it is desirable to keep data available in an on-line database that is readily accessible to users for long periods of time. This goal can present problems, however. A relational database containing, for example, records of all telephone calls for a particular area may grow by as much as 110 gigabytes per month. It is expensive and impractical to store a relational database this large on a single, fast, storage device.

Figure 1:
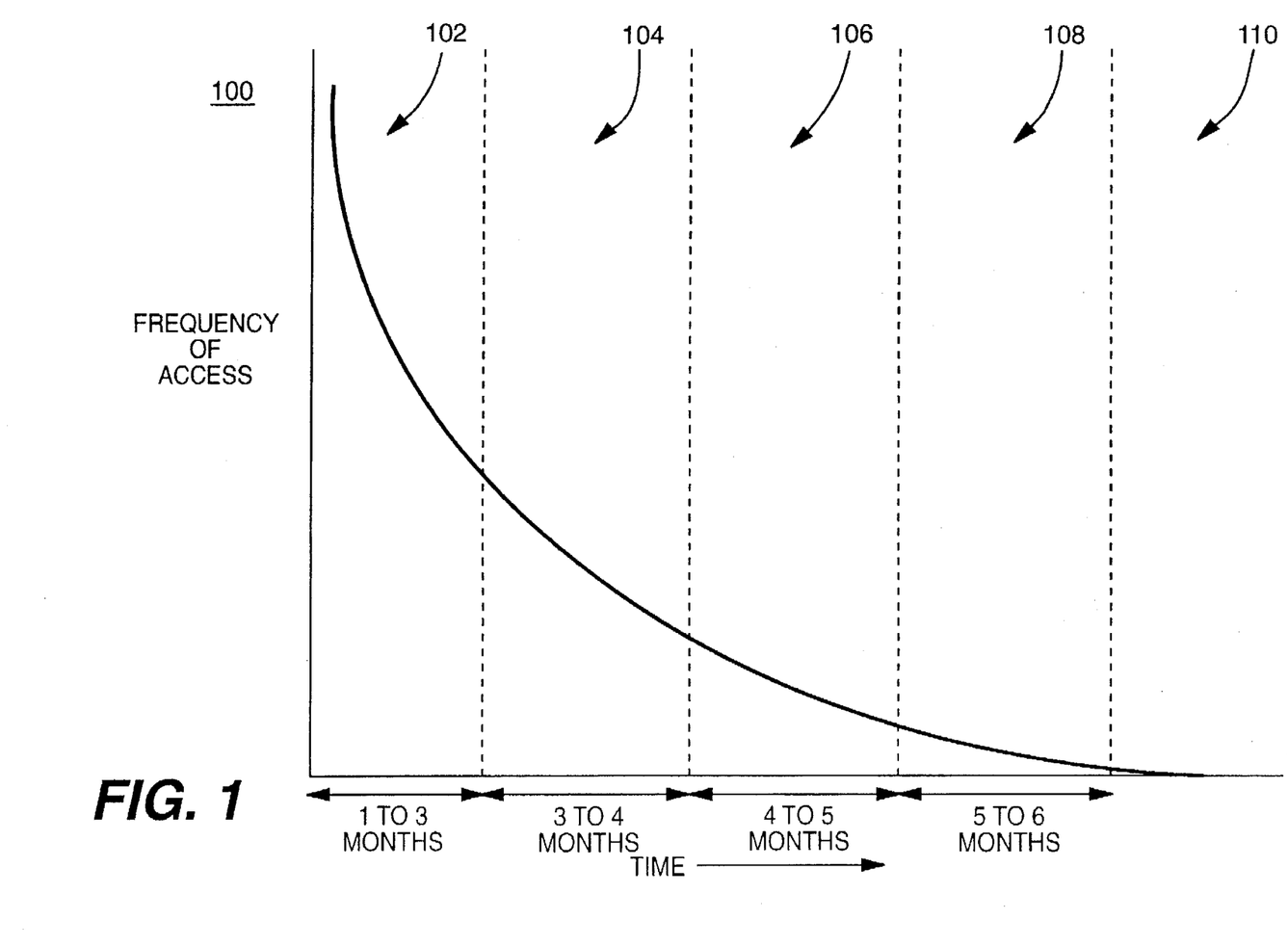
FIG. 1 is a graph showing the frequency with which records in a database are accessed versus the time that the records have been present in the database.

FIG. 1 is a graph 100 showing frequency of database access versus the length of time records have been present in the database. The frequency of access for a record is highest in the first time slot 102. Thus, during time slot 102, which may be one to three months, records should be available to database users with little delay in access time. As the age of the data progresses through time slots 104 (1 to 3 months), 106 (3 to 4 months), 108 (5 to 6 months), and 110 (greater than 6 months), the frequency with which the records are accessed decreases as explained above. The less frequently one needs to access a record, the longer wait one can tolerate.

Figure 2:
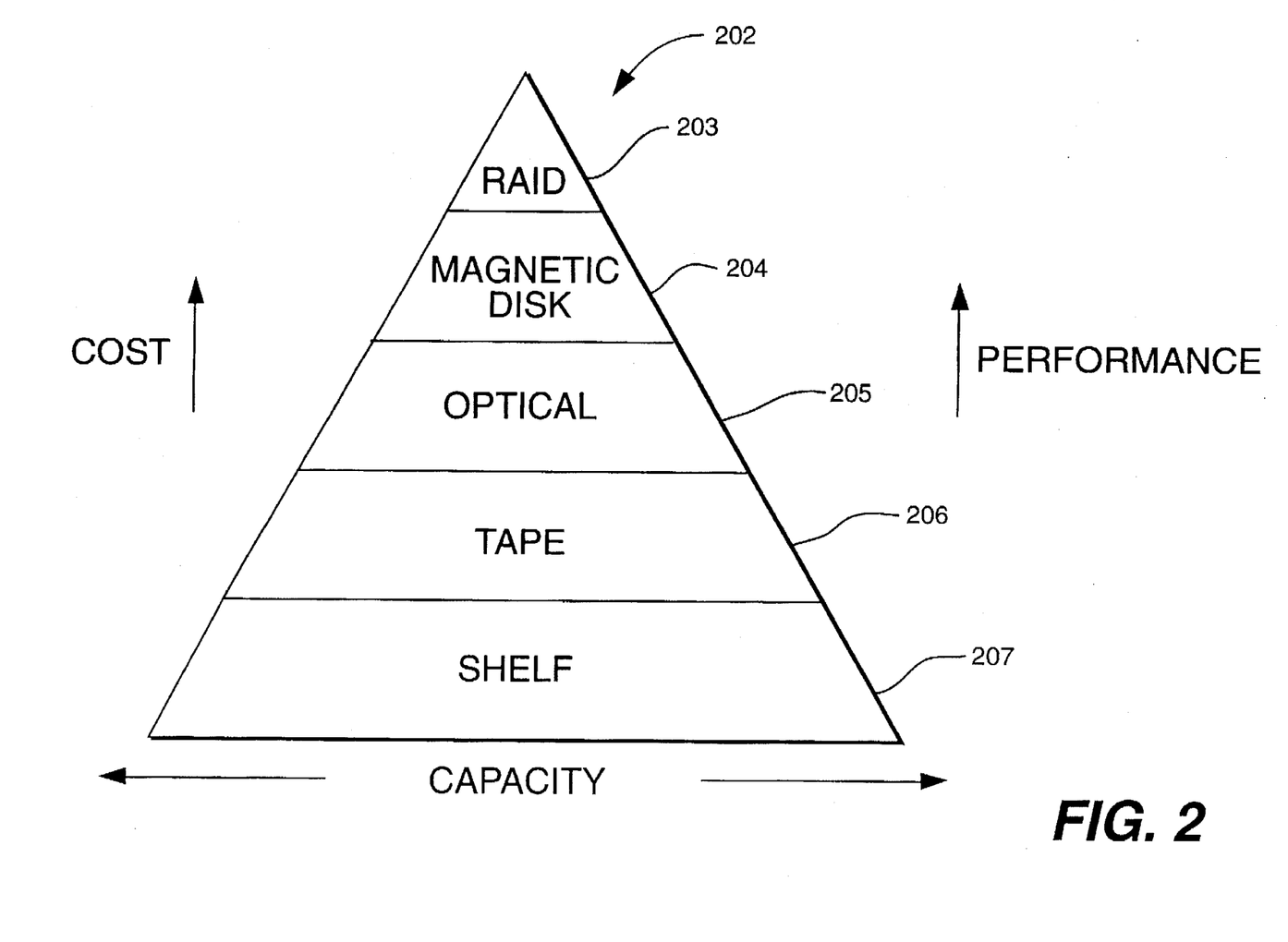
FIG. 2 is a pyramid graph showing the relationship between storage media cost, performance, and capacity.

FIG. 2 is a pyramid graph 202 showing the relationship between storage media cost, performance, and capacity. At the top of the pyramid is RAID (Redundant Array of Inexpensive Disks) storage 203, followed succeedingly by magnetic disk storage 204, optical storage 205, tape storage 206, and finally, off-line shelf storage 207. FIG. 2 illustrates that the performance of a storage medium (measured by, for example, access time and read time) increases with the cost of the medium. Also, as the cost and performance increase, the capacity of the medium tends to decrease.

One solution to storing large amounts of data that takes advantage of its properties as explained in FIGS. 1 and 2 is to periodically move the older, less frequently-accessed data to slower, less expensive storage devices. For example, a file may migrate from a magnetic disk, to an optical disk library, to an automated tape library, and finally to shelf storage magnetic tape. This solution permits large amounts of data to be stored on a reasonably priced set of storage devices. The disadvantage of the slow rate of reading data from magnetic tape is minimal because accesses to the magnetic tape occur relatively infrequently.

Storing large amounts of data across more than several storage devices creates its own problem, however. There is, presently, no way to split a relational database across multiple storage devices while maintaining the ability to query the complete relational database as a single entity. To date, organizations typically retain only the most current information in an on-line, searchable database and archive the older data. This archiving process is not consistent with ongoing needs for timely on-line access to corporate information.

SUMMARY OF THE INVENTION

Accordingly, the present invention is directed to a method and apparatus for segmenting and searching a database that obviate one or more of the problems due to limitations and disadvantages of the related art.

Features and advantageous of the invention will be set forth in the description which follows, and in part will be apparent from the description, or may be learned by practice of the invention. The objectives and other advantageous of the invention will be realized and attained by the method and apparatus particularly pointed out in the written description and claims thereof as well as the appended drawings.

To achieve the objects of this invention and attain its advantageous, broadly speaking, this invention includes a method for populating a database with a sequentially received bit stream. The method comprises the steps of dividing the bit stream into a plurality of data segments and storing each data segment. Then, for each of the data segments, creating at least one segment index. The plurality of data segments together form the database. Finally, creating a range index corresponding to the database for indexing the segment indices.

Both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENT

This invention creates and uses a relational database that efficiently takes advantage of the characteristics of data storage devices in order to store a large database. The relational database of this invention is divided into multiple data segments, each of which may be independently stored on any of several storage devices. The devices are searched using a hierarchy of indices including a high level range index and lower level segment indices. The range index filters a database search query to determine what segment indices and devices will be used to process the query. Only the determined segment indices and devices need to be accessed. Thus, with only a single input query, the present database system performs an efficient search of a complete database spanning multiple devices.

Reference will now be made in detail to a preferred embodiment of the invention, examples of which are illustrated in the accompanying drawings. Wherever possible, the same reference numbers will be used throughout the drawings to refer to the same or like parts.

Figure 3:
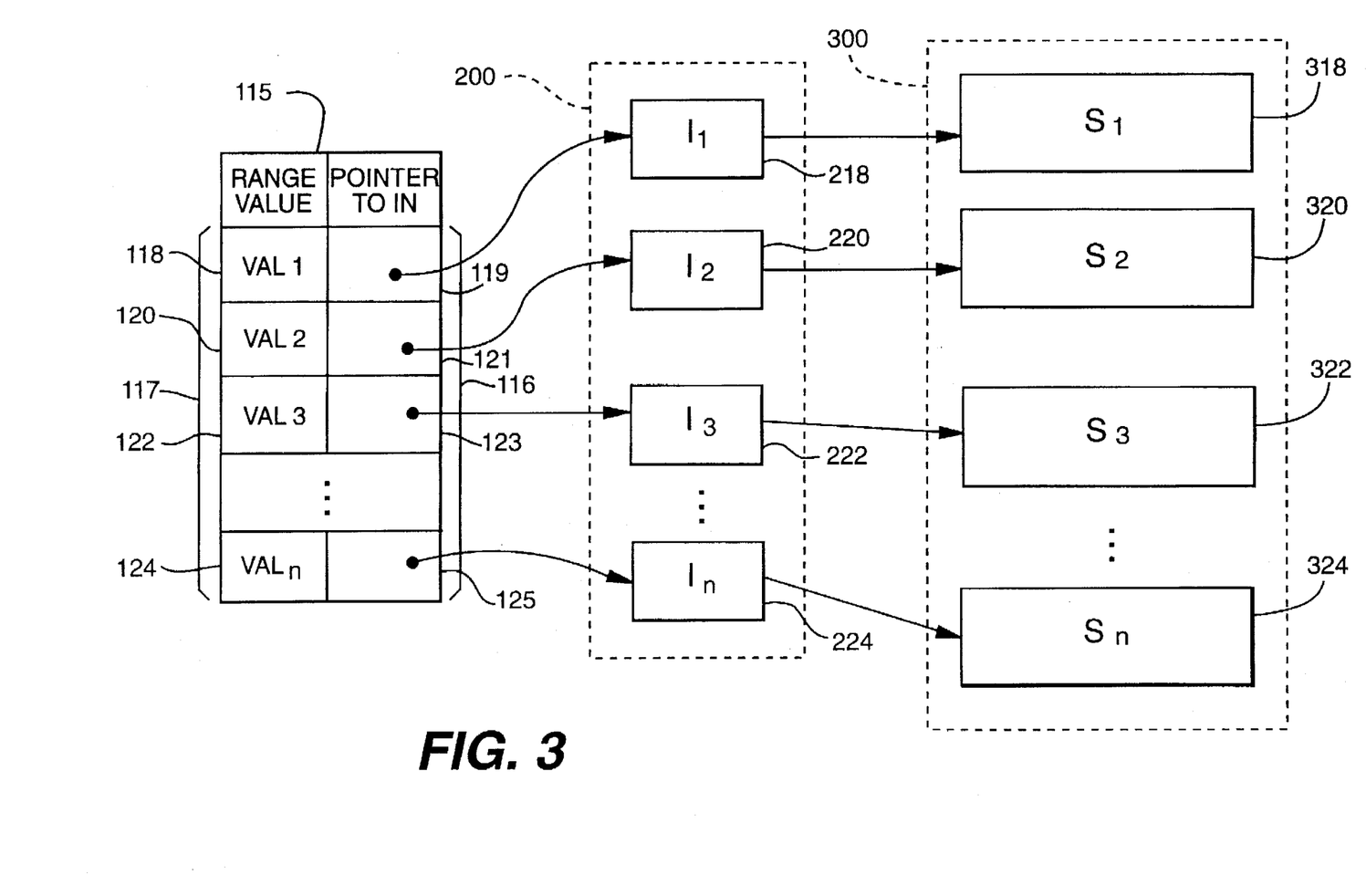
FIG. 3 is a diagram showing the organization of a segmented database and the indexing scheme according to a preferred embodiment of the present invention.

FIG. 3 is a diagram showing the organization of a segmented database 300 and the indexing scheme of the present invention. In FIG. 3, exemplary database 300 is divided into data segments $S_1$ 318, $S_2$ 320, $S_3$ 322, and $S_n$ 324. The data for each data segment is preferably selected based on a range parameter corresponding to a record field. Although any of the record fields may be used, the date field is preferred. For example, the data segments may be grouped into date ranges corresponding to calendar years, for example, data segment $S_1$ 318 contains records in the year-range 1995, data segment $S_2$ 320 contains records in the year-range 1994, data segment $S_3$ 322 contains records in the year-range before 1993, and data segment $S_n$ 324 contains all records in the year-range before 1993.

Segments $S_1$ 318 through $S_n$ 324 may each be stored on different types of storage media. For example, data segment $S_1$ 318 may be stored on a standard Direct Access Storage Device (DASD) such as a magnetic disk, data segment $S_2$ 320 may be stored on a RAID storage device, data segment $S_3$ 322 may be stored on an optical storage device such as a CDROM, and data segment $S_n$ 324 may be stored using a tape storage device. Alternatively, multiple data segments may be stored on the same type of media or even on the same storage device.

Further, the segments may be in different volumes on the same type of media.

Database index table 200 includes segment indices 218, 220, 222 and 224. Each data segment 318 through 324 is indexed by its corresponding segment index 218 through 224, respectively, by having each segment index store index information to retrieve records in its corresponding data segment.

The segment indices 218 through 224 may be stored on the same storage device as their corresponding data segments or on different storage devices, and several segment indices may be stored on the same storage device. Preferably, segment indices 218 through 224 are stored on a fast access storage device, such as a DASD storage device.

Range index 115 contains range-values 117 (including VAL1 118, VAL2 120, VAL3 122, and $VAL_n$ 124) used to select the pointers 116 (including pointers 119, 121, 123, and 125) for referencing the segment indices 218 through 224. A single query of the database may select one or more of the segment indices 218 through 224. The range-values 117 define the highest and lowest data values in each segment index 218 through 224 and are used to minimize the number of data segments 318 through 324 that must be retrieved to satisfy a query. This is particularly useful for date/time based queries. In the example, data segments 318 to 324 are divided by year, VAL1=1995, VAL2=1994, VAL3=1993, and $VAL_n$=before 1993. In turn, the indices in segment index 218 would correspond to records for 1995 in data segment $S_1$ 318. Similarly, the indices in segment index 220 would correspond to the records for 1994 in data segment $S_2$ 320, the indices in segment index 222 would correspond to the records for 1993 in data segment $S_3$ 322, and the indices in segment index 224 would correspond to the records before 1993 in data segment $S_n$ 324.

Figure 4:
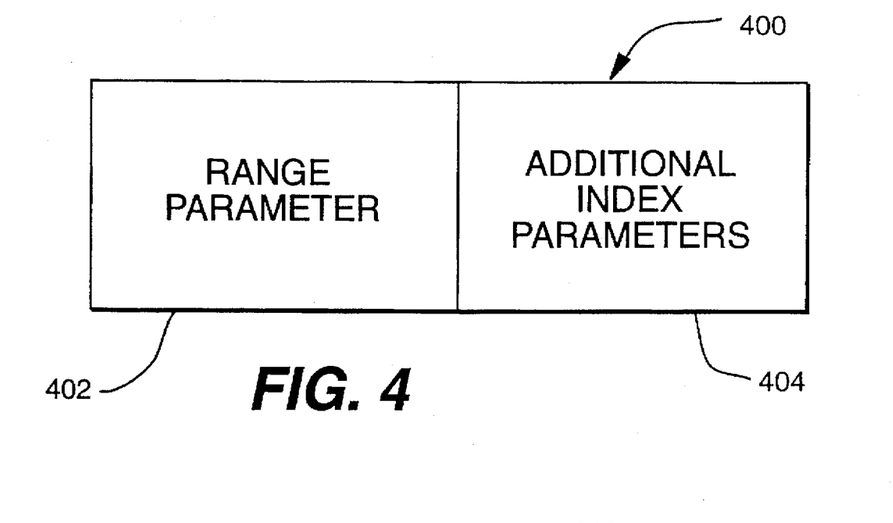
FIG. 4 is an exemplary format of a typical database query as used in the preferred embodiment of present invention.

In operation, the selection of the appropriate segment indices and data segments will be based on a client database query. The format of a typical database query 400 is shown in FIG. 4. At least two parameters are typically used: the range parameter 402 identifying which segment index 218 through 224 is to be searched and an additional index parameter 404 defining the values to be matched to the segment indices. The database query 400 is preferably an industry standard SQL query containing the range parameter 402 and the additional index parameters 404.

The range parameter 402 is matched against the range index 115 to determine the segment index (or indices) 218 through 224 to access. If range parameter 402 is not entered by the user, a default range parameter will be assigned by the database searching system. For example, if the range parameter 402 specifies the years 1993-1994 and the database query 404 specifies records relating to "Smith," the database searching system will match the range parameter 402 to range values 120, 122, which correspond to pointers 121, 123, respectively. Pointers 121, 123 are then linked to segment indices 220, 222, which index data segments 320, 322. If, using segment indices 220, 222, the database searching system determines that the corresponding data segments 320, 322 contain the records in the query, the system accesses those segments and reads the appropriate records. If segment indices 220, 222 determine that their corresponding data segments 320, 322 do not contain records that match the query, the data segments do not need to be accessed.

Each segment index 218, 220, 222, 224 preferably includes multiple indices for accessing its data segment.

Figure 5:
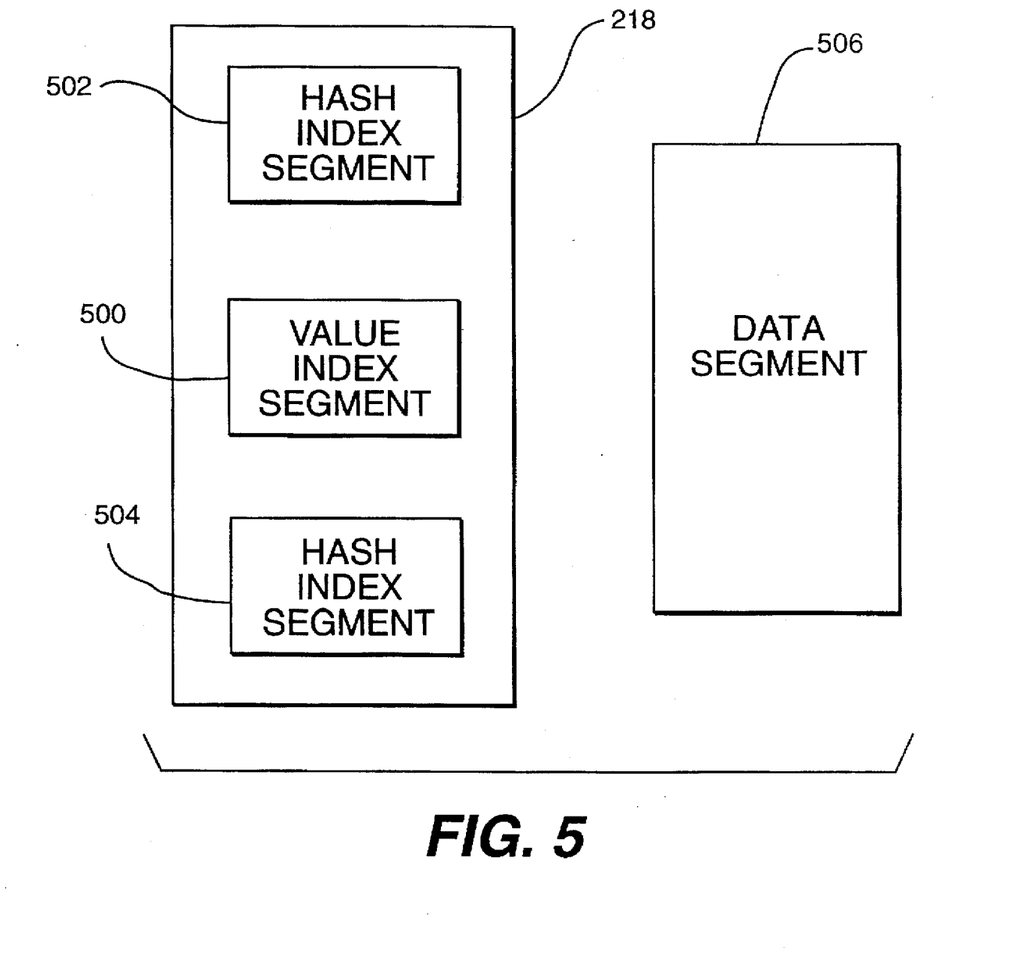
FIG. 5 is a more detailed block diagram of the segment index and its corresponding data segment as used in the preferred embodiment of the present invention.

FIG. 5 shows segment index 218 as an aggregation of indices 500, 502, and 504. Each index 500, 502, and 504 independently corresponds to data segment 506 and is either a value index or a hash index. Preferably, the system uses a value index when the query being processed scans the index for a range of values, such as a query accessing all account numbers in the range 10–20, and a hash index when the query accesses a single value, such a query accessing account number 10.

Figure 6:
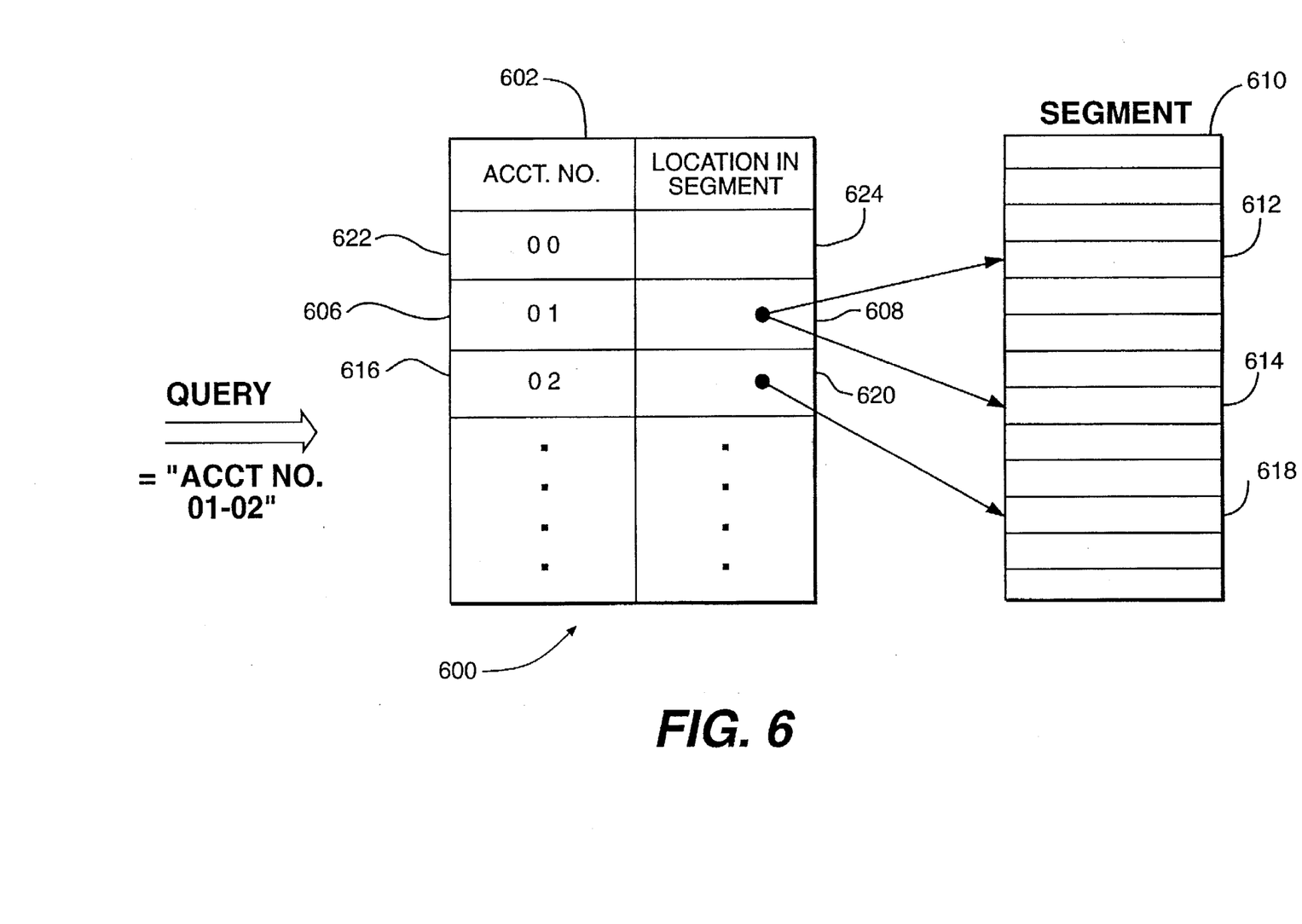
FIG. 6 is a flow diagram illustrating an indexing process carried out by the value index as contemplated in the preferred embodiment of the present invention.

FIG. 6 illustrates value index matching for an exemplary database query "Acct. No. 01-02". In FIG. 6, segment index 600 includes an account number field 602 containing account numbers 622, 606, and 616. Corresponding to each account number 622, 606, and 616 is a location field 624, 608, and 620 used to reference records in database segment 610. Further, it is assumed in this figure that the range indexing for this query has previously been performed with the result that segment index 600 is to be searched for all records relating to account numbers 01-02. Preferably, a binary tree search is performed to locate the queried field quickly, but other search techniques such as a sequential search could also be used. In this example, account number 01 is matches account number field 606, corresponding to the location field 608. Location field 608 references records 612, 614 in data segment 610. Account number 02 matches account number field 616, corresponding to the location field 620. Location field 620 references record 618 in data segment 610. Although in this example location fields 620, 608 referenced one and two data segments, respectively, in the preferred embodiment the location fields may reference any number of the records in data segment 610.

Figure 7:
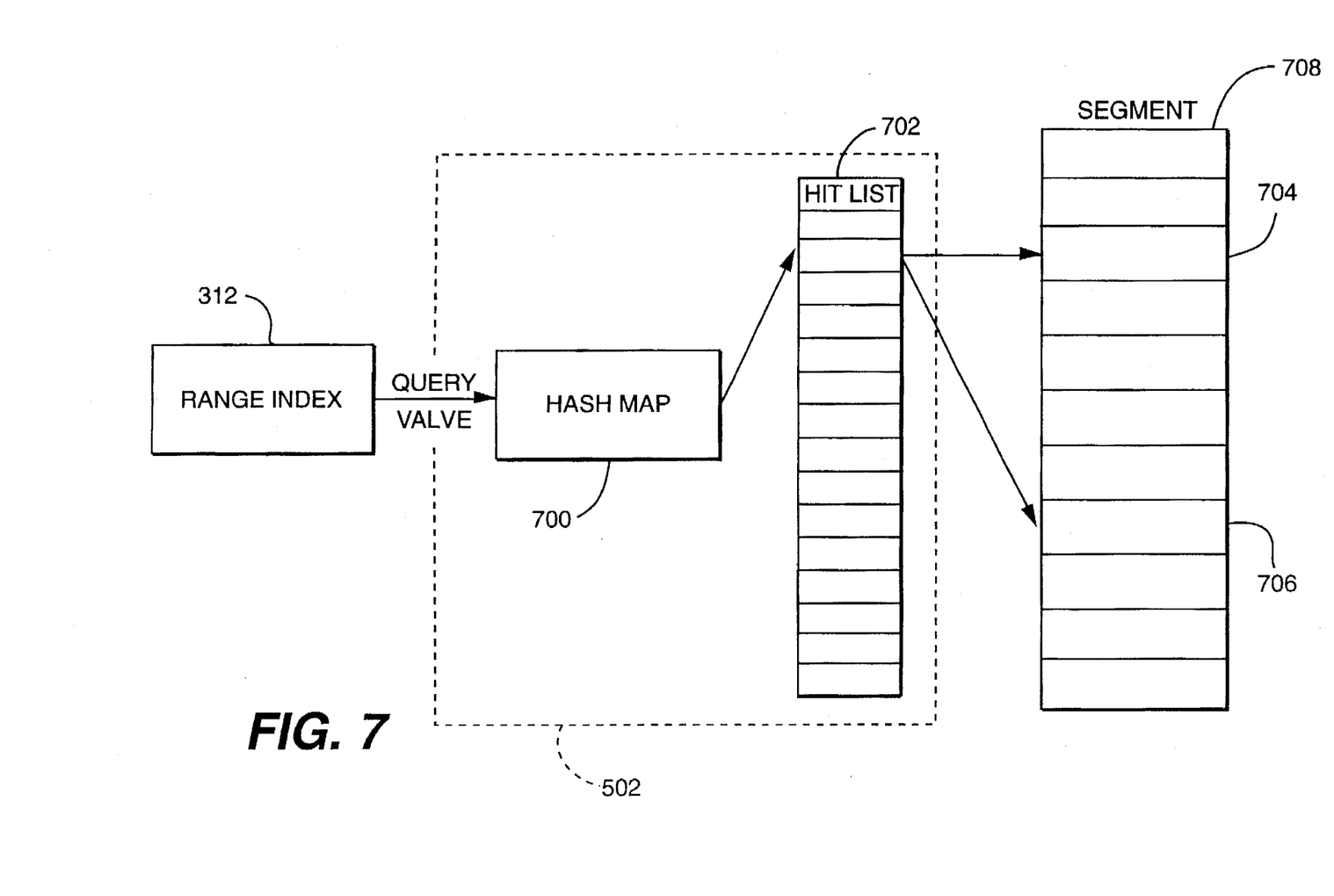
FIG. 7 is a flow diagram illustrating an indexing process carried out by the hash index as contemplated in the preferred embodiment of the present invention.

FIG. 7 is a block diagram that illustrates the indexing process carried out by the hash index 502. Hash index 502 contains a hash map 700 for the hash index along with a hit-list 702 corresponding to each of the entries in the hash map. The system maps a query received from the range index 312 by the hash map 700 into an entry into hash hit-list 702. In this example, the system determines records 704, 706 to be "hits" by the hit-list 702.

Figure 8:
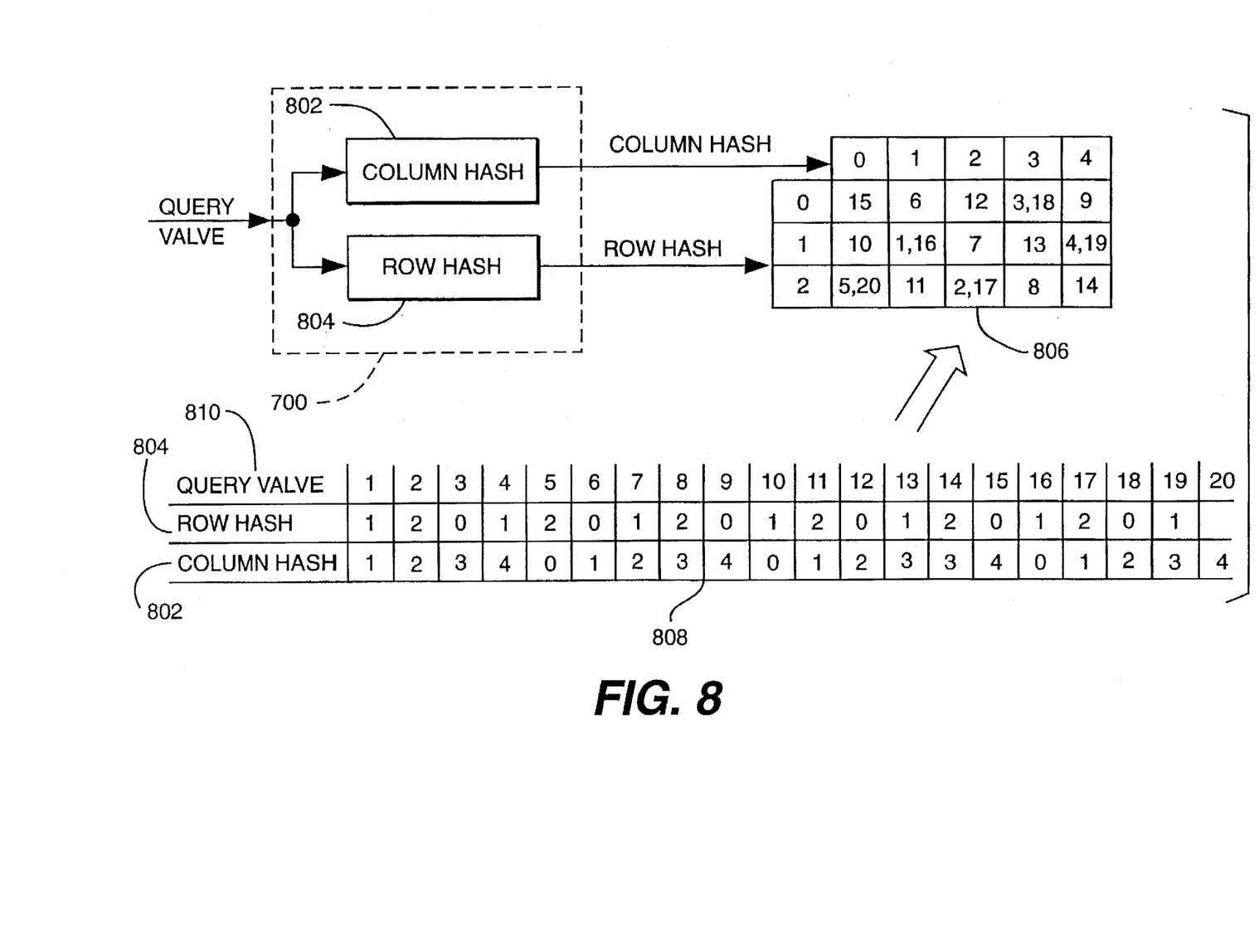
FIG. 8 is a flow diagram illustrating a two-dimensional hashing scheme contemplated in the preferred embodiment of the present invention.

Hash map 700 can use many types of hash mapping functions. FIG. 8 illustrates a two-code hash-mapping function used in the preferred embodiment of the present invention. The two-code hash-mapping function minimizes the number of hash collisions while taking up relatively little storage space. As FIG. 8 shows, column hash 802 and row hash 804 each independently map the query value. Table 808 shows twenty sample query values 810 mapped by the row hash 804 and column hash 802. Row hash 804 maps to three distinct values: 1, 2, and 0. Column hash 802 maps to 5 distinct values: 0, 1, 2, 3, and 4. In table 808, for example, the row hash 804 maps query value 1 to 1, query value 5 to 2, and query value 18 to 0. Similarly, the column hash 802 maps query value 1 to 1, query value 8 to 3, and query value 15 to 4.

Row hash 804 and column hash 802, however, do not individually map to enough distinct values to avoid hash collisions. For example, row hash 804 maps query values 3, 6, 9, 12, 15, and 18 to the same value, resulting in a 6-way hash collision. To minimize hash collisions, the preferred embodiment uses a two dimensional hash table 806 that takes advantage of the row hash 804 and the column hash 802. In the two-dimensional hash table, query value 6 maps to a unique hash value, the column hash 802 and row hash 804 pair (1,0). This is a significant improvement over the 6-way collision with only the row hash 804. Query value 3 maps to a 2-way collision at hash pair (3,0), significantly improving over the row hash 804 6-way collision.

Although in this example the hashes were shown as mapping to a small number of distinct values (3 and 5), in practice, hashes usually map to a much larger number of distinct values. For example, in the preferred embodiment the column hash 802 and the row hash 804 each map to approximately 65519 distinct values.

Figure 9:
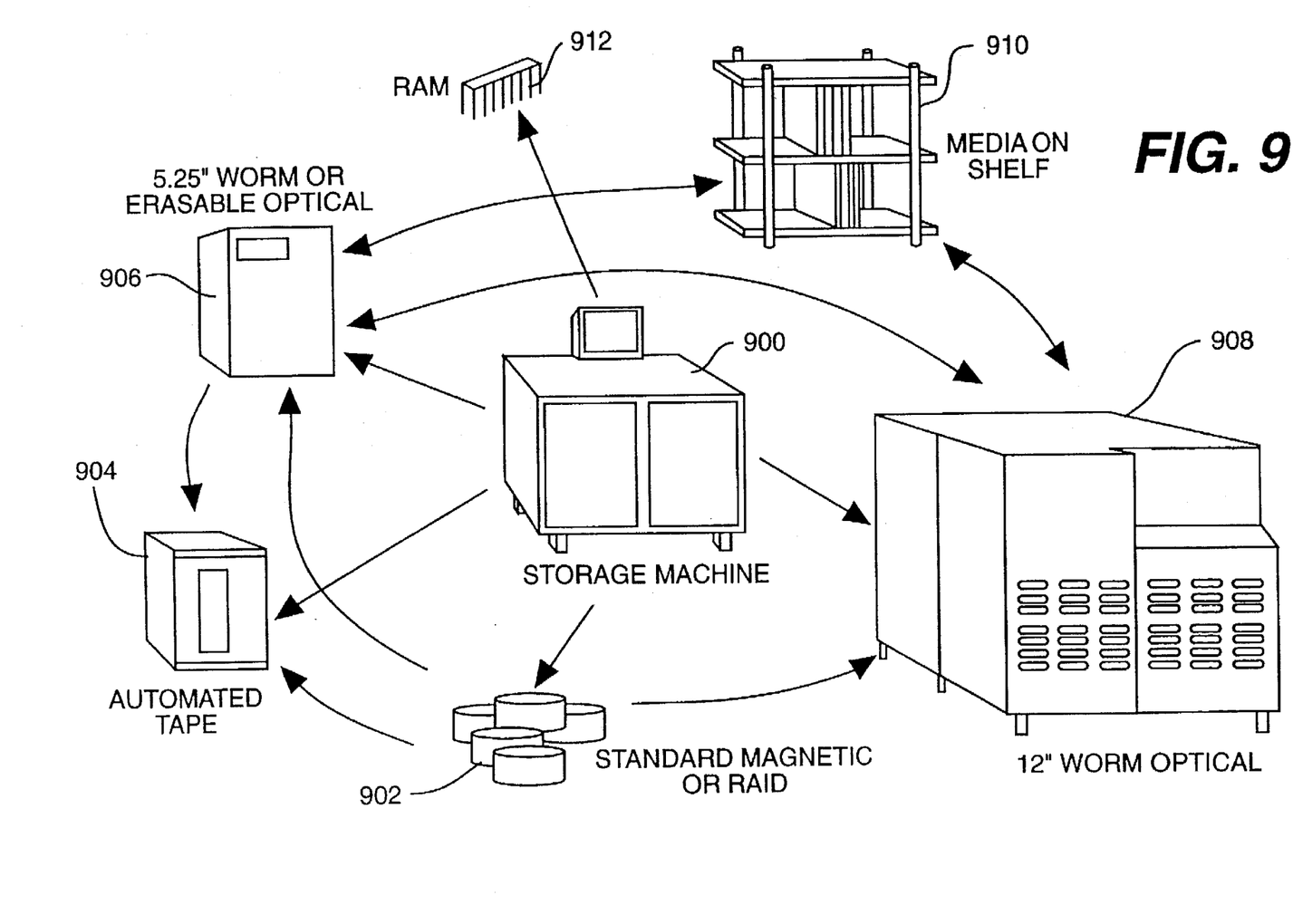
FIG. 9 is an illustration of the physical control device and storage devices used to implement the preferred embodiment of the present invention.

FIG. 9 illustrates an exemplary system to implement a preferred embodiment of the present invention. Storage machine 900 is connected to and has read/write access to the RAM storage 912, standard magnetic disk or RAID cluster 902, the 12" WORM optical system 908, the automated tape system 904, and the 5.25" WORM or erasable optical drive 906. Further, the media on shelf storage system 910 can be used to archive the least frequently accessed data. The storage machine 900 manages the storage and transfer of data between the storage devices 902, 904, 906, 908, and 910. Typically, new data is first written to the magnetic disk devices 902 or RAM 912 for fast write performance. The data can later be automatically migrated to the other storage devices by the storage machine 900.

An important advantage of the present invention is that it allows for transparent client access from a variety of different platform architectures to a single database that may be split between one or more of the storage devices 902–912. A user searching the database at a remote PC, for example, does not need to know how, or on what devices the database is physically stored. The storage machine 900 automatically manages this. To the user, the database appears to be a single entity searchable with standard SQL queries.

Figure 10:
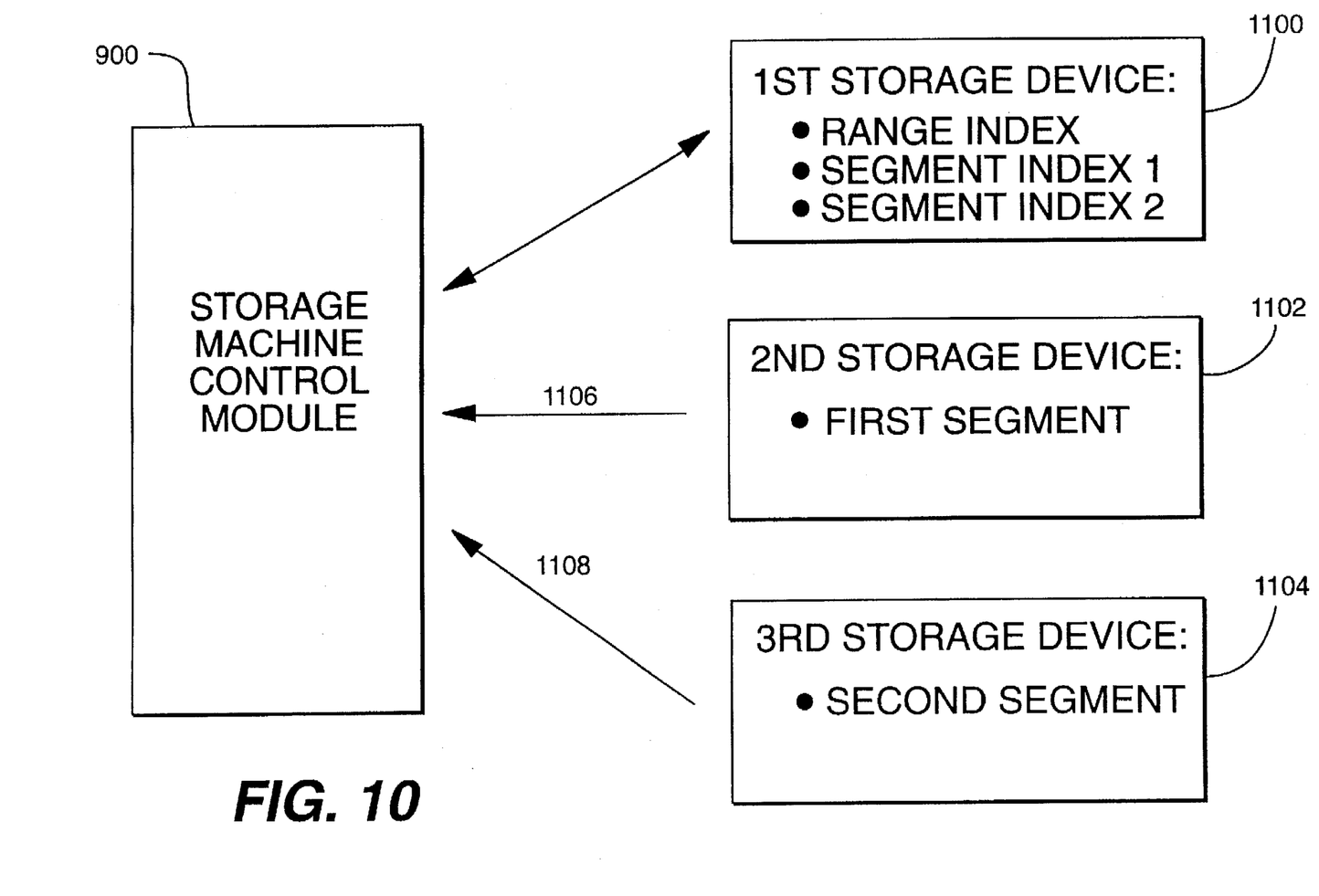
FIG. 10 is a block diagram showing how a parallel data read from multiple segments can be processed according to the preferred embodiment of the present invention.

Another advantage of the present invention is that data from multiple table data segments can be transferred in parallel. This aspect of the invention is illustrated in FIG. 10. In this figure, the storage machine 900 is coupled to: a first magnetic storage device 1100 containing a database range index, a first segment index, and a second segment index; a second storage device 1102 containing a first database segment; and a third storage device 1104 containing a second database segment. If a user enters a query that the range index and segment indices determine requires data from both the first and second database segments, i.e., from devices 1102 and 1104, the storage machine 900 transmits the addresses to access over lines 1106, 1108. Because devices 1102, 1104 are independent of each other, they can simultaneously read the required data and transmit it back to the storage machine 900 over lines 1106, 1108.

Figure 11:
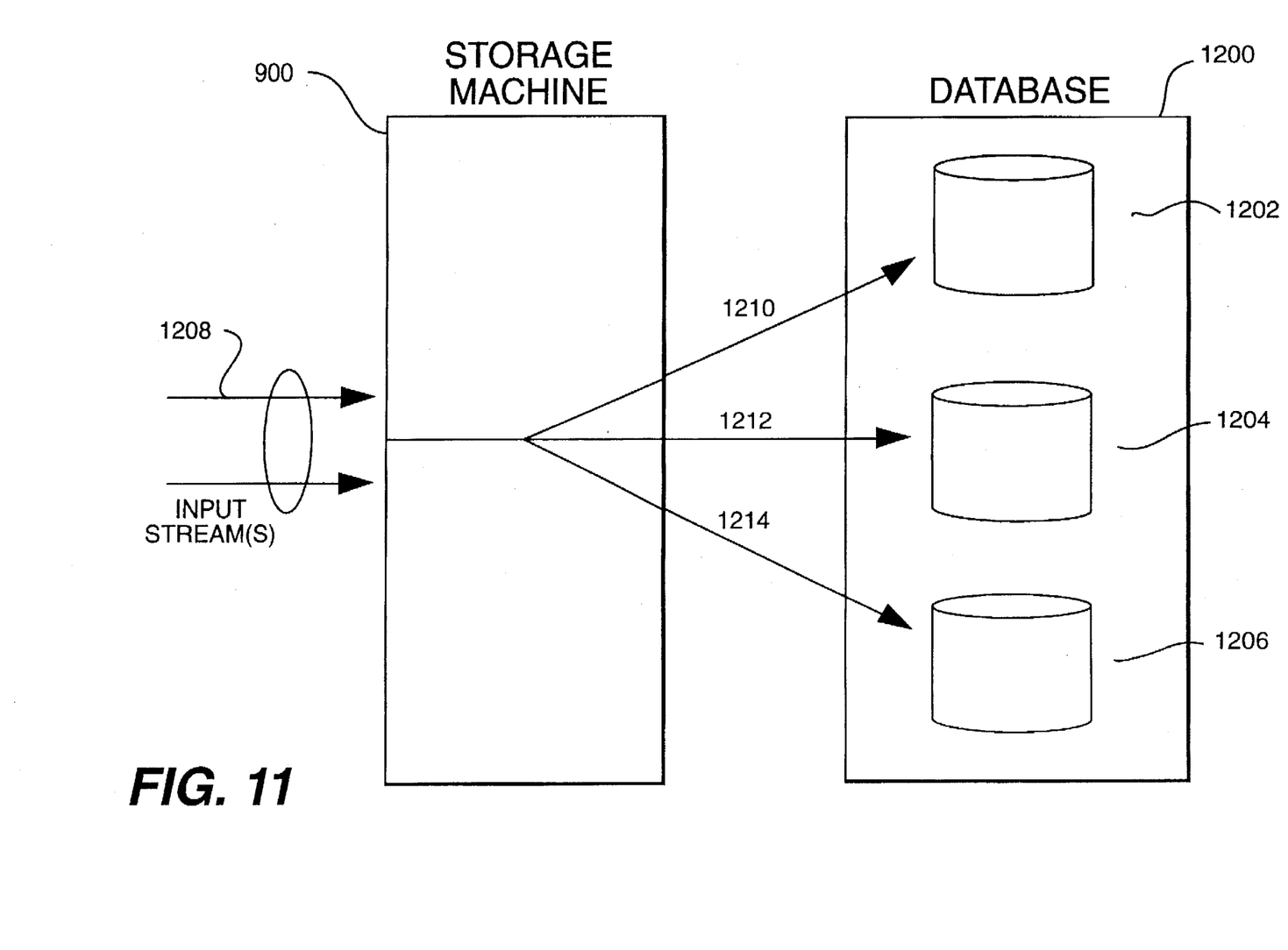
FIG. 11 is a block diagram showing how a parallel data write to multiple segments can be processed according to the preferred embodiment of the present invention.
Figure 12:
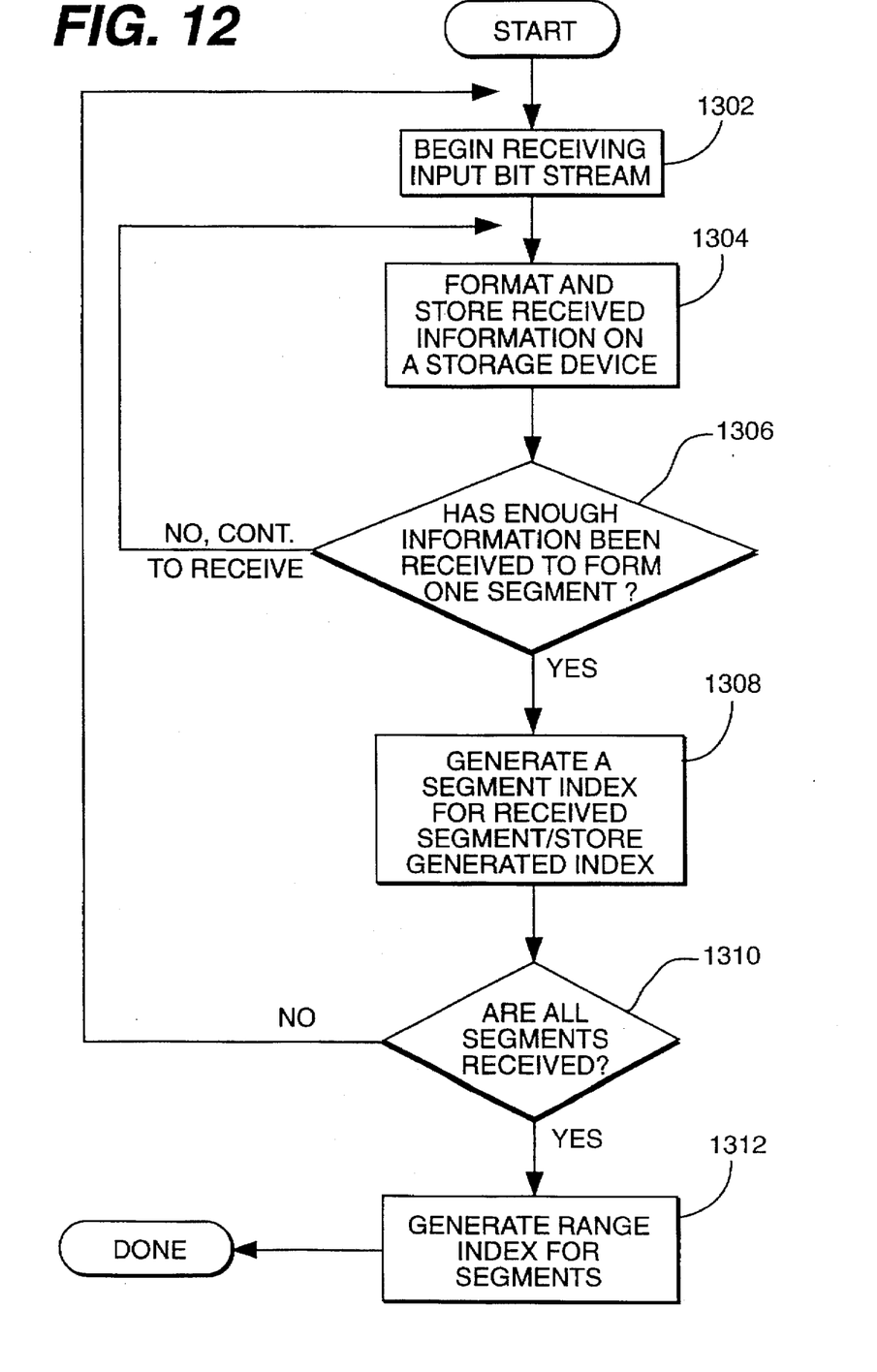
FIG. 12 is a flow diagram illustrating an input bit stream segmentation as contemplated in the preferred embodiment of the present invention.

In the preferred embodiment of the present invention, it is possible to simultaneously load multiple storage devices with the database segments and segment indices. FIG. 11 shows a data stream or streams 1208 received by the storage machine 900 and then simultaneously transferred to storage devices 1202, 1204, and 1206 of database 1200. In this manner, the storage machine 900 loads the database segments and segment indices in parallel, allowing a large data set to be quickly formatted and stored as a relational database across multiple storage devices faster than if the database was to be stored on a single storage device. In FIG. 12, each of storage devices 1202, 1204, and 1206 may store one or more segment indices or database segments.

FIG. 12 is a flow diagram showing the database population method of the preferred embodiment of the present invention. In this figure, the database system receives an input stream to be segmented at step 1302 and formats and stores the stream in step 1304. Step 1306 periodically checks to see if enough information has been received to form a complete data segment. If so, a segment index for the received data segment is generated and stored at step 1308.

At step 1310, the database system checks if all the data segments have been received. If the data segments have not all been received, a new bit stream is started, step 1302. If the data segments have all been received, a range index is generated for the database, step 1312. One skilled in the art will recognize that this process may be used to append new segments or delete old segments and corresponding range index records.

Figure 13:
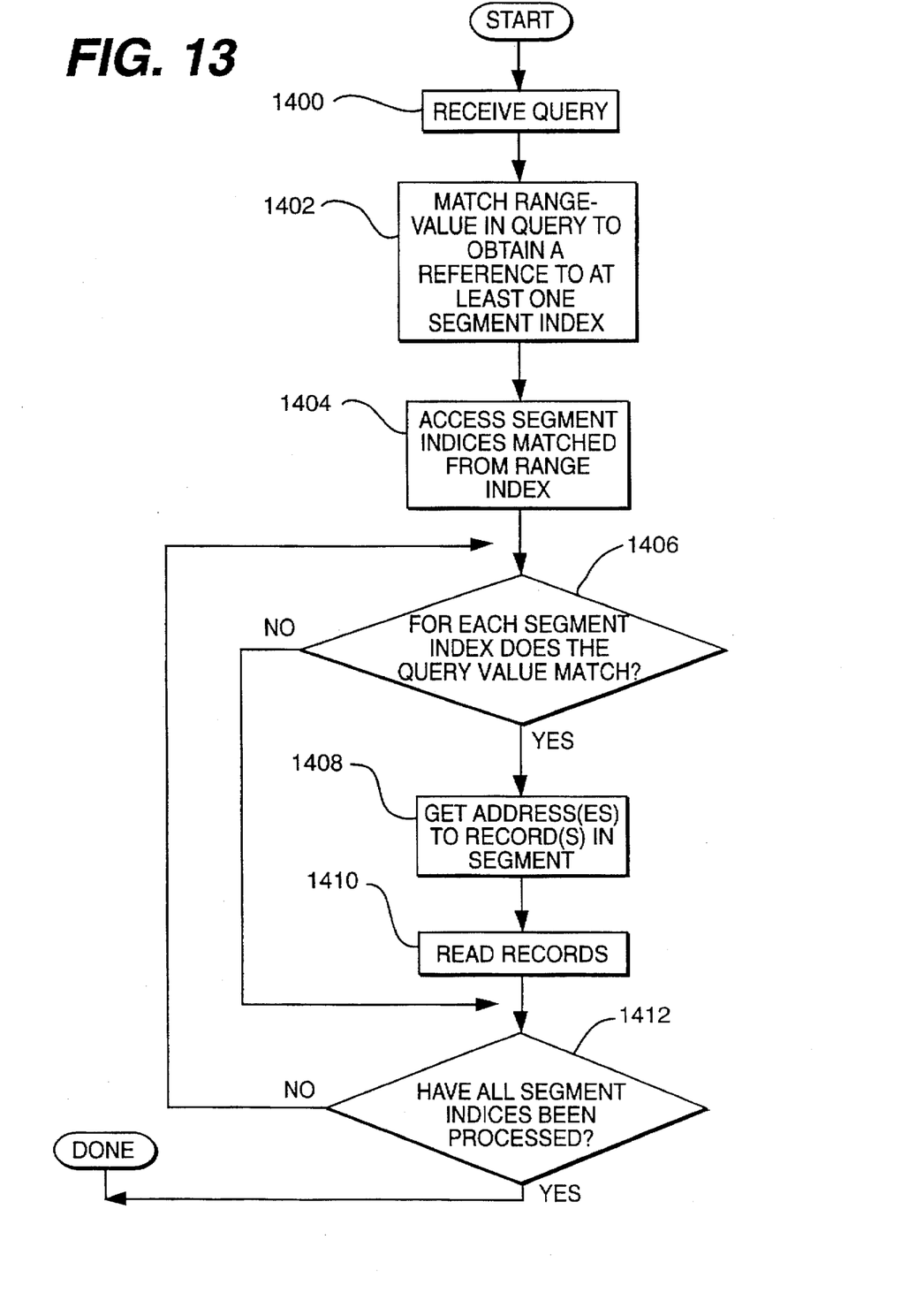
FIG. 13 is a flow diagram illustrating a query and retrieve operation on a database as contemplated in the preferred embodiment of the present invention.

FIG. 13 is a flow diagram showing the database record retrieval method of the preferred embodiment of the present invention. In this figure, step 1400 receives the database query. The range-value from the query is matched to the range index to obtain a reference to segment indices, step 1402. Each referenced segment index is accessed and matched against the query value, step 1404. If the query value matches the segment index in step 1406, the corresponding address(es) to record(s) in the data segment are retrieved, step 1408, and the data segment is accessed, step 1410. If in step 1406, the database system determines that the query value does not match the segment index, the method proceeds to step 1412. This step checks whether all the segment indices have been processed. If all the segment indices have been processed, the access is finished. If all the segment indices have not been processed, step 1406 again executes to determine if the query value matches the next segment index.

In summary, the present invention contemplates a database that may be stored in data segments across multiple storage devices and on multiple volumes within the same storage device. A high level range index is used to segment the database records into multiple storage devices. The range index is searched based on a range parameter chosen so that each data segment is stored on a storage device most suited to the accessing pattern of that segment. Typically, a time/date range parameter is used.

Matching the range parameter to the range index identifies one or more segment indices to be searched. Segment indices not identified do not have to be searched. Each segment index includes one or more indices for searching its corresponding data segment. The database system chooses the index within the segment index based on the type of query entered. A query for a range of records is typically searched with a value index, while a query for specific records is typically searched with a hash index.

It will be apparent to those skilled in the art that various modifications and variations can be made in the present invention without departing from the scope or spirit of the invention. As an example, multiple range indices may be used to access a data segment (e.g., date and serial number). As another example, the range index and/or the index segments may be implemented using a bitmap structure. As yet another example, instead of operating with a relational or standard database, the present invention may be used with an object oriented database by segmenting the objects in the object orientated database in the manner described in this disclosure based on the object attributes.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for storing at least a portion of a database in one or more memory devices, comprising the steps of:

dividing the portion of the database into a plurality of data segments each said data segment corresponding to a different range of values in a selected field of the database;

storing each of said data segments in said one or more memory devices;

storing for each of said stored data segments, a segment index identifying the corresponding data segment; and storing a range index with entries corresponding to the ranges of the selected field, each of the entries of the range index identifying the one of the segment index for the data segments corresponding to that range.

2. The method of claim 1, further comprising the step of organizing the storage devices such that recently created records are stored on faster storage devices than older records created prior to the recently created records.

3. A method of retrieving records from a database divided into a plurality of data segments, indexed by and corresponding to at least one segment index indexed by corresponding entries in a range index, the method comprising the steps of:

receiving a query including at least one range parameter and at least one query-value;

identifying a range-value of the range index from the received range parameter to obtain a first reference to at least one of the segment indices;

matching the query-value to the first referenced segment indices to obtain a second reference to each said data segment that corresponds to the segment indices referenced by the first reference; and retrieving the records corresponding to the second reference in each said data segment that corresponds to the segment indices referenced by the first reference.

4. The method of claim 3, wherein the retrieving step further comprises the step of retrieving the records from different data segments in parallel.

5. The method of claim 3, wherein the range parameter is a date, and wherein the step of identifying further comprises the step of identifying the range-value corresponding to a date range.

6. The method of claim 3, further comprising the step of retrieving records stored on different storage devices.

7. The method of claim 6, further comprising the step of organizing the storage devices such that recently created records are stored on faster storage devices than older records created prior to the recently created records.

8. The method of claim 3, wherein the step of receiving a query further comprises the step of allowing the database to be accessed and queried by a user as a single relational database.

9. The method of claim 3, further comprising the step of storing the segment indices on different storage devices than said corresponding data segments.

10. The method of claim 3, wherein the range further comprises the step of corresponding the range-value to a time range.

11. A data storage and retrieval system for accessing elements of a relational database divided into a plurality of data segments, the system comprising:

a plurality of storage means for respectively storing each of the plurality of data segments;

a plurality of segment indices for indexing elements of the data segments, each segment index corresponding to one of the plurality of data segments; and a range index for indexing the plurality of segment indices based on a first parameter specifying a temporal range;

wherein the elements of the relational database are retrieved using the range index to identify one or more of the segment indices to access based on the first parameter and for each segment index accessed, identifying the elements to retrieve based on a second parameter.

12. The system of claim 11, wherein the first and second parameters are contained within an SQL query of the relational database.

13. The system of claim 11, wherein the plurality of storage means are at least one of: magnetic disk, erasable optical disk, WORM optical disk, and automated tape storage.

14. A data storage and retrieval system for accessing elements of a relational database divided into a plurality of data segments, the system comprising:

storage means for respectively storing each of the plurality of data segments;

a plurality of segment indices for indexing elements of the data segments, each segment index corresponding to one of the plurality of data segments; and a range index for indexing the plurality of segment indices based on a first parameter specifying a range;

wherein the elements of the relational database are retrieved using the range index to identify one or more of the segment indices to access based on the first parameter and for each segment index accessed, identifying the elements to retrieve based on a second parameter.

15. The system of claim 14, wherein the storage means is automated tape storage.

16. The system of claim 14, further comprising means for receiving the first parameter and the second parameter, the means for receiving being linked to multiple computer platforms.

17. The system of claim 14, wherein the plurality of data segments are stored on different volumes of the storage means.

18. A method of modifying an existing database stored on one or more memory devices, comprising the steps of:

updating a data segment of the database on the one or more memory devices;

generating a segment index corresponding to the updated data segment, the segment index for indexing data of the data segment;

updating a range index of the database to reflect the generated segment index, the range index for indexing a plurality of segment indices, the plurality of segment indices including the generated segment index.

19. The method of claim 18, wherein the step of updating a data segment further comprises storing an input data stream as a data segment on the one or more memory devices.

20. The method of claim 19, wherein the step of updating a data segment further comprises deleting a data segment on the one or more memory devices.

* * * * *